(12) United States Patent
Shaw

(10) Patent No.: US 10,981,214 B2
(45) Date of Patent: Apr. 20, 2021

(54) INVESTMENT CASTING COMPOSITIONS

(71) Applicant: Richard D. Shaw, Kent (GB)

(72) Inventor: Richard D. Shaw, Kent (GB)

(73) Assignee: Richard D. Shaw, Kent (GB)

( * ) Notice: Subject to any disclaimer, the term of this patent is extended or adjusted under 35 U.S.C. 154(b) by 61 days.

(21) Appl. No.: 16/215,439

(22) Filed: Dec. 10, 2018

(65) Prior Publication Data
US 2019/0176218 A1   Jun. 13, 2019

(30) Foreign Application Priority Data

Dec. 11, 2017 (GB) .................................... 1720619

(51) Int. Cl.
| | | |
|---|---|---|
| *B22C 1/16* | (2006.01) | |
| *B22C 1/18* | (2006.01) | |
| *B22C 1/14* | (2006.01) | |
| *C04B 35/63* | (2006.01) | |
| *C04B 35/111* | (2006.01) | |

(52) U.S. Cl.
CPC ............... *B22C 1/165* (2013.01); *B22C 1/14* (2013.01); *B22C 1/181* (2013.01); *B22C 1/185* (2013.01); *C04B 35/1115* (2013.01); *C04B 35/6313* (2013.01); *C04B 2235/5212* (2013.01); *C04B 2235/5224* (2013.01); *C04B 2235/5228* (2013.01); *C04B 2235/5232* (2013.01); *C04B 2235/5236* (2013.01); *C04B 2235/6028* (2013.01)

(58) Field of Classification Search
CPC .......... B22C 1/165; B22C 1/14; B22C 1/181; B22C 1/185; B22C 7/00; B22C 7/02; B22C 9/04; B22C 9/043; B22C 9/046
See application file for complete search history.

(56) References Cited

U.S. PATENT DOCUMENTS

| | | |
|---|---|---|
| 2,209,035 A | 7/1940 | Prosen |
| 5,250,110 A | 10/1993 | Gantert et al. |
| 2002/0195225 A1* | 12/2002 | Shaw ..................... B22C 1/165 164/519 |
| 2004/0221768 A1 | 11/2004 | Horton |
| 2005/0087323 A1* | 4/2005 | Hathaway ............ B22D 29/002 164/522 |
| 2013/0187302 A1* | 7/2013 | Tsadok Hai ............. B22C 1/06 264/16 |
| 2015/0367405 A1* | 12/2015 | Hoffman, Jr. .......... B22C 1/181 106/38.9 |

FOREIGN PATENT DOCUMENTS

| | | |
|---|---|---|
| GB | 716394 A | 10/1954 |
| GB | 801187 A | 9/1958 |
| GB | 870836 A | 6/1961 |
| GB | 913770 A | 12/1962 |
| GB | 2294232 A | 4/1996 |
| GB | 2350810 A | 12/2000 |
| GB | 2492781 A | 1/2013 |
| JP | 2003-286121 A | 10/2003 |
| JP | 2011-167726 A | 9/2011 |
| RU | 2165817 C1 | 4/2001 |
| WO | 2005/075130 A1 | 8/2005 |

OTHER PUBLICATIONS

GB 1720619.4 Search Report dated Jun. 5, 2018, 2 pages.
Extended European Search Report for EP 18210799.5 dated Mar. 13, 2019, 7 pages.
European Search Report for EP 20192951 dated Oct. 28, 2020, 2 pages.

* cited by examiner

Primary Examiner — Kevin P Kerns
Assistant Examiner — Steven S Ha
(74) Attorney, Agent, or Firm — Nixon Peabody LLP; Linda B. Huber

(57) ABSTRACT

A composition which comprises a soluble or partially soluble phosphate, a refractory material and less than 1% of an oxide or hydroxide of magnesium or calcium. The composition may be mixed with water to form an investment casting slurry into which a wax pattern may be dipped. Slurry coated onto the pattern may be set by applying a stucco composition which comprises an oxide or hydroxide of magnesium or calcium. Coats of set slurry may be built up on the pattern to form an investment casting shell.

18 Claims, No Drawings

INVESTMENT CASTING COMPOSITIONS

CROSS-REFERENCE TO RELATED APPLICATIONS

This application claims priority under 35 U.S.C. § 119(a) and § 365(b) to British patent application No. GB 1720619.4 filed Dec. 11, 2017, the entirety of which is hereby incorporated by reference.

TECHNICAL FIELD

The present invention relates to compositions for use in investment casting. More particularly the invention relates to investment casting compositions useful for forming slurries, slurries for forming investment casting shells, methods of forming investment casting shells, investment casting shells, and methods of investment casting.

BACKGROUND OF THE PRESENT DISCLOSURE

Investment casting is a process for forming metal parts. A wax (or similar low melting point material such as polystyrene) pattern which is a replica of the part to be cast is created and dipped into a refractory investment casting slurry. The slurry is allowed to set on the pattern, and the dipping/drying process is repeated to build up a shell comprising a number of coats of set slurry. The shell and the pattern are then heated to melt the pattern. The pattern is thereby removed from the shell to leave a void in the shell which corresponds to the shape of the part which is to be cast. The shell is then fired at high temperature. Molten metal is then poured into the void in the shell and allowed to solidify into the shape of the void. The shell is removed from the solidified metal part and the cast part may then be finished to remove any unwanted material.

Existing slurries used to form investment casting shells are based on a silica sol binder system. Investment casting compositions are described in GB2350810 A and GB 2492781 A.

Problems associated with conventional slurries and casting processes include slow slurry drying times, high space requirements to store drying shells, shell cracking during the de-waxing and/or firing process, sedimentation of the slurry, the need for pH control to address the stabilization of the slurry, low shelf life of slurry and high cost of forming the slurry. It is amongst the objects of the invention to address one or more of these problems.

In a first aspect the invention provides an investment casting composition comprising a soluble or partially soluble phosphate, a refractory material and less than 1 wt % of an oxide or hydroxide of magnesium or calcium. The term 'soluble or partially soluble' as used herein refers to solubility in water. This investment casting composition may be mixed with water to form an improved slurry for investment casting. In a method of investment casting using such an investment casting composition, the slurry coat formed by dipping the pattern in the slurry will contain phosphate ions in a wet/solvated form. Magnesium oxide, calcium oxide, magnesium hydroxide or calcium hydroxide in a solid form may then be applied to the wet slurry coat. The magnesium or calcium ions react with the phosphate ions in the wet slurry coat to form insoluble magnesium or calcium phosphate. This ion exchange results in the setting of the slurry coat to form a hard shell. This is a completely different process to the silica based setting of prior art slurries.

The low amount of oxides or hydroxides of magnesium or calcium in the composition means that the soluble or partially soluble phosphate in the liquid slurry will not undergo premature setting (due to ion exchange) to form insoluble magnesium or calcium phosphates. This prolongs the shelf life of a slurry formed using the composition and enhances its stability to separation. When the terms 'oxides or hydroxides of magnesium or calcium' are used herein, it should be understood that these terms include mixed, or substituted oxides or hydroxides containing one or more, or a mixture of, those cations/anions.

The composition may comprise insoluble fibres. The insoluble fibres give strength to the unfired shell, and organic fibres, when burnt out, give the shell porosity to make a set shell slightly porous to air and other gasses released due to the de-waxing and/or firing process. In preferred embodiments the fibres are organic. When the fibres are organic they are combusted during a firing process to leave the porous structure in the shell. Providing fibres is useful in preparing investment casting shells because the shells themselves are thin and are liable to cracking during gelling, drying, dewaxing or firing of the shell or casting of a molten metal in the shell.

Preferably 1-2 wt % of insoluble fibres are present in the investment casting composition. Preferably the insoluble fibres' length to diameter ratio is between 25:1 and 100:1. More preferably the insoluble fibres' length to diameter ratio is 50:1. The investment casting compositions of the present invention preferably have the median group of their fibre lengths is the range 0.25-1.5 mm, and more preferably in the range of 0.5-1.5 mm.

In preferred embodiments, the insoluble fibres may be selected from the group of polyester, nylon, polypropylene, acrylic, modified acrylic, viscose or rayon, carbon fibres, kermal-aramid fibres, Kevlar® fibres or combinations thereof.

The insoluble fibres may be ground to reduce their length prior to their incorporation in the investment casting composition. The grinding means may be a mortar and pestle, a milling machine or other grinding means known in the art of grinding.

If the fibres have been ground they may be separated according to their length. A portion of the ground water insoluble fibres having a substantially desired length distribution may be retained and incorporated. This separation may comprise at least one sieving step. The at least one sieving step may be an aerated sieving step. The sieving process preferably selects a range of fibres below a maximum value. The sieve selects fibres by allowing them to pass through apertures which have a largest width equal to the desired maximum fibre length. Inevitably, some fibres which pass through the apertures of the sieve will have a length greater than the preferred maximum length. This is because some fibres may pass through the sieve apertures lengthways rather than sideways. When it is stated hereafter that a quantity of fibres have a 'substantial distribution of their lengths' under a certain maximum value, it should be understood that this 'substantial' distribution refers to the fact that substantially all of the fibres have lengths under this maximum length. The only fibres which have lengths greater than this length are the ones which have unintentionally passed through the sieve. These may be regarded as superfluous and are less preferable than fibres below the maximum length. The grinding process produces fibres having a wider distribution of lengths than the cutting process which has been used previously in the art. The insoluble fibres used in the investment casting compositions of the present invention may be obtainable by grinding and may be optionally selected according to their length.

Preferably the insoluble fibres are obtainable by grinding and have a substantial distribution of their lengths below a maximum length. If the insoluble fibres of the present invention have been ground as detailed above, they preferably have a substantial distribution of their lengths below the maximum lengths of 1 mm, 1.2 mm, or 1.5 mm.

Preferably the fibres are polyester. Preferably the fibres have lengths of 1.5 mm or a substantial distribution of their lengths below the maximum value of 1.5 mm.

The fibres described above may be selected such that the step of eliminating the expendable pattern from the coating shell (e.g. dewaxing) does not cause the elimination of the fibres from the shell. Thus, where said pattern is to be eliminated by means of heating said shell to an elimination temperature which exceeds the melting point or sublimation temperature or decomposition temperature of said expendable pattern, said fibres may be selected such that the melting point of said fibres exceeds said elimination temperature. This will ensure that the fibres remain intact notwithstanding elimination of the pattern. The retention of said fibres in the shell will serve to maintain the green strength of the shell.

The refractory material may be mullite, Mollochite 200®, fused silica, aluminosilicates, fused, calcined or tabular aluminas, zircon, and other heat stable refractory materials known to one skilled in the art.

The investment casting composition preferably comprises less than 0.4 wt %, 0.37 wt % or 0.3 wt % and preferably 0.2 wt % or less of an oxide or hydroxide of magnesium or calcium. Ensuring low amounts of oxides or hydroxides of magnesium or calcium means that the soluble or partially soluble phosphate in the liquid slurry will not undergo premature setting due to ion exchange to form insoluble magnesium or calcium phosphates. This prolongs the shelf life of a slurry formed using the composition and enhances its stability to separation.

In some embodiments the soluble or partially soluble phosphate comprises mono ammonium phosphate (MAP). MAP is also known as Ammonium dihydrogen phosphate (ADP). This is particularly advantageous for forming shells to cast steels which require high temperature fired shells.

The soluble or partially soluble phosphate may comprise mono sodium phosphate (MSP). The soluble or partially soluble phosphate may comprise mono potassium phosphate (MKP). These phosphates are particularly useful in confined environments where the evolution of ammonia presents a disadvantage.

The soluble or partially soluble phosphate may comprise a mixture of two or more of; mono potassium phosphate, mono sodium phosphate and mono ammonium phosphate.

The soluble or partially soluble phosphate may comprise disodium phosphate, diammonium phosphate, dipotassium phosphate, or mixtures thereof. Partially soluble mono phosphates of magnesium and aluminium can also be used when provided in powder form.

A liquid phosphate may be used in the investment casting composition. This may be selected from Clinochem P450 (proprietary solution of magnesium aluminium phosphate mix), available from Clinochem Limited of Dunedin High Elms Road, Downe, Orpington, Kent, BR6 7JN, and Clinochem P8 (polyammonium phosphate), available from Clinochem Limited of Dunedin High Elms Road, Downe, Orpington, Kent, BR6 7JN.

The refractory material may be molochite 200®. The investment casting composition preferably comprises 5-30 wt %, and preferably 15-25 wt %, of the phosphate as a proportion of the amount of refractory material in the investment casting composition. The investment casting composition may be a dry mix.

In a second aspect the invention provides an investment casting slurry comprising an investment casting composition as described herein and water. The viscosity of the slurry is preferably 10-50, and preferably 20-40 on a B4 cup.

Preferably 450-550 ml of water is provided per kg of dry mix when adding water to the investment casting compositions described herein in their dry mix forms. This ratio forms a slurry having a viscosity of 28-32 on a B4 cup.

In some embodiments, when a liquid phosphate is used to form the investment casting composition and the associated slurry, a sintering aid such as bentonite, fumed silica or calgon or a mixture thereof may be added to reduce the firing temperature of the shells.

Preferably the insoluble fibres are at a concentration of 5-30 g/L of water in the slurry. The exact amount will depend upon the fibre density, length and thickness.

In a third aspect the invention provides a method of producing an investment casting shell comprising the steps of;

providing a slurry comprising water, a refractory material, and a soluble or partially soluble phosphate, dipping a pattern in the slurry to form a coat of slurry on the pattern, applying a stucco composition which comprises magnesium oxide, calcium oxide, magnesium hydroxide or calcium hydroxide to the slurry coated on the pattern, and allowing the slurry and the stucco composition to set to form a shell.

The slurry coat formed by dipping the pattern in the slurry will contain phosphate ions in a wet/solvated form. Magnesium oxide, calcium oxide, magnesium hydroxide or calcium hydroxide in a solid form may then be applied to the wet slurry coat. The magnesium or calcium ions will react with the phosphate ions in the wet slurry coat to form insoluble magnesium or calcium phosphate. This ion exchange results in the setting of the slurry coat to form a hard shell. This is a completely different process to the silica based setting of prior art slurries. The magnesium and calcium compounds mentioned above are preferred as stucco compositions. Sintered or calcined magnesium oxides are preferred.

The slurry may further comprise insoluble fibres make a set shell slightly porous to air and gasses released due to the firing process. In preferred embodiments the fibres are organic. When the fibres are organic they are combusted during the firing process to leave a porous structure in the shell. Providing fibres is useful in preparing investment casting shells because the shells themselves are thin and are liable to cracking during drying or dewaxing, and the fibres provide resistance to thermal shock during firing of the shell or casting of a molten metal in the shell. The slurry used may be a slurry as described herein.

Preferably the stucco composition is granular. Preferably the $D_{50}$ particle size of the stucco composition is between 0.25 mm and 1 mm. This provides an even covering of the stucco composition on the slurry coat. This ensures that the slurry coat sets quickly and evenly. As is well known, it is preferred for the stucco to be free of dust, or at least have a low proportion of dust sized particles. This reduces the likelihood of delamination of shells formed by the method.

The steps of dipping the pattern, applying the stucco composition and allowing the slurry to set to form a shell may be repeated.

The method may further comprise the step of heating the shell to melt the pattern.

The method may further comprise a step of dipping the shell in a binder solution after the shell has been heated to remove the pattern, and before the shell is fired. This provides an increase in the strength of the shell, once it has been fired. Suitable binder solutions include those which comprise silica sol, sodium or potassium silicate, ethyl silicate, or a phosphate.

Heating the shell to remove the (usually wax) pattern, is thought to create an amount of porosity in the shell by the egress of water during the heating process. The heating of the shell to remove the pattern is carried out at temperatures which are well below firing temperatures.

In a preferred embodiment of the process the slurry used in the method comprises insoluble fibres, and the method includes a step of dipping the shell in a binder solution after the shell has been heated to remove the pattern, and before the shell is fired. By dipping the shell in a binder solution after heating to remove the pattern, and then subsequently firing the shell, a high strength shell which is sufficiently porous that it has a reduced chance of cracking during casting is provided. This is thought to be because porosity which is created by the egress of water during the heating to remove the pattern is filled by the binder solution. This increases the strength of the fired shell. The insoluble fibres are intended to burn out of the shell during firing, leaving voids which provide porosity to the fired shell. This reduces the likelihood of a shell cracking when it is used in an investment casting process. By adding further binder after heating and before firing, the (weakening) porosity created by the egress of water during heating is specifically addressed, rather than filling up all of the pores created by both the egress of water and the fibres, as would be the case if dipping in the binder was done after the firing step.

The binder added in the post-heating (and pre-firing) step soaks into the shell from the outside. This means that a high proportion of the pores which are closer to the external surface will be filled with binder (and thereby strengthened). Whereas, a low proportion of pores which are closer to the interior of the shell will be filled with binder. This provides the additional advantage that the fired shell is weakest at its interior, which is nearest to the cast part once it has been used in a casting process. This assists with removal of the shell from the cast part, whilst still providing a strong shell that is resistant to cracking.

The method may further comprise the step of firing the shell at 700-900° C.

In a fourth aspect the invention provides a method of investment casting comprising the step of delivering molten metal into a fired shell obtainable by the methods described herein.

The method may further comprise the steps of allowing the molten metal to solidify and removing the shell to provide a cast part, and optionally finishing the cast part.

In a fifth aspect the invention provides an investment casting shell comprising a refractory material and calcium or magnesium phosphate. The shell may be obtainable by a method described herein.

The invention will now be described with reference to the following examples. All of the slurries of the examples were used to form investment casting shells using the same method. A wax pattern was dipped into the slurry and then removed from the slurry. Granulated magnesite (MgO) (the stucco composition) having a $D_{50}$ of between 0.25 and 1 mm was then sprinkled onto the slurry. The $Mg^{2+}$ ions in the magnesite bonded with the water soluble or partially soluble phosphate ions. The insoluble magnesium phosphate which is formed by this cation 'exchange' results in the formation of a hard, set shell. Similar results would be achieved using a stucco composition comprising calcium oxide, magnesium hydroxide or calcium hydroxide.

EXAMPLE 1

1000 g molochite, 125 g MAP, 125 g MSP and 15 g of nylon fibre (3.3 dctx by 1.6 mm long) were mixed to form a stable dry mix. The dry mix was then mixed with water to produce a stable slurry at a viscosity of between 30/32 on a B4 cup. This slurry was used to build up a shell formed of 6 coats.

EXAMPLE 2

1000 g of 200 mesh zircon flour, 300 g MSP and 25 g cut nylon fibre (3.3 dctx 1 mm long) were mixed to form a dry mix. Water was added to the dry mix to produce a slurry having a viscosity of 40 on a B4 cup. This mixture is particularly useful as a face coat, i.e. the first coat of a shell, due to the presence of Zircon flour and the associated wetting properties.

EXAMPLE 3

500 g of fused silica 200 mesh, 500 g zircon 200 mesh, 250 g MSP and 25 g polyester fibre (3.3 dctx 0.25/1 mm long) were mixed to form a dry mix. 450 cc of water was added to the dry mix to form a slurry having a viscosity of 40 on a B4 cup. This slurry can be used for first coat or backup coats.

EXAMPLE 4

A 25 kg dry mix was prepared. 6 kg MSP, 19 kg of molochite and 300 g of nylon fibre (3.3 dctx by 1.5 mm long) were mixed. In use, this dry mix was added to 13 l of water to form a slurry. The viscosity was between 30 and 32 on a B4 cup. This composition provides very strong shells after firing. This is because the sodium product of the ion exchange reaction has a low melting point and therefore helps to sinter the shell. This makes this composition well suited for nonferrous metals which have lower casting temperatures, but unsuitable in some ferrous applications which require higher casting temperatures (as the sodium product would melt completely). A shell using this composition can be made ready for metal casting in as little as 4 hours.

EXAMPLE 5

A dry mix and slurry was prepared as in example 4, but using 3 kg of MSP and 3 kg of MAP, instead of the 6 kg of MSP.

EXAMPLE 6

A dry mix and slurry was prepared as in example 4, but using 6 kg of MAP, instead of the 6 kg of MSP. This composition produces a weak shell when fired at 800° C. but is useful for speciality steels which require high temperature fired shells.

EXAMPLE 6A

A dry mix and slurry was prepared as in example 6, but using 6 kg of mono Magnesium phosphate powder, instead of the 6 kg of MSP. This composition produces a weak shell when fired at 800° C. but is useful for speciality steels which require high temperature fired shells.

EXAMPLE 6B

A dry mix and slurry was prepared as in example 6A, but using 6 kg mono aluminium phosphate powder, instead of the 6 kg of mono Magnesium phosphate powder.

EXAMPLE 7

A dry mix and slurry was prepared as in example 4, but using 6 kg MKP as an alternative to MAP. Some examples of the use of liquid phosphates are as follows in examples 8 and 9:

EXAMPLE 8

Clinochem P450 (proprietary solution of magnesium aluminium phosphate mix available from Clinochem Limited of Dunedin High Elms Road, Downe, Orpington, Kent, BR6 7JN), or Brenntag FFB80 or Albrite Magolop was diluted with water in the ratio of one part by volume of phosphate to one part by volume of water. Fibre was added at 20 mg per litre of prepared solution together with molochite 200® mesh to give the requisite viscosity. This makes a very strong shell but requires higher firing than the normally accepted firing temperatures. An alternative to high temperature firing is to add a sintering aid such as bentonite or fumed silica or calgon.

EXAMPLE 9

Clinochem P8 (polyammonium phosphate) or Albrtite 36AZ is treated in the same way as in example 8. This example generates significant quantities of $NH_3$ while gelling which in production might limit its application.

EXAMPLE 10

An example of dry phosphate bond:
To prepare a dry binder blend mix, 500 g of MSP and 500 g of MAP were mixed with 75 g of polyester fibres (3.3 dctx by 1.5 mm long). To this dry blend water and refractory are mixed as described above.

EXPERIMENT 11

An investment casting slurry was prepared using a mono sodium phosphate (MSP). This preparation used mono sodium phosphate as the bonding component for the shell. The slurry was made by combining 80 g of MSP crystals with 320 g of calcined china clay (Molochite 200) and mixing this into warm water of approximately 20° C. to give a smooth slurry of viscosity 30 seconds on a B4 cup. The slurry was left overnight to de-air and allow the phosphate to dissolve.

Surprisingly on the following day it was found that the slurry was readily remixed to homogeneity. After retesting the viscosity the slurry was used to make a shell in the following manner.

A wax pattern was dipped into the slurry (as in normal practice) for 10 seconds and slowly removed to allow excess to drain off the pattern thus leaving a thin film of slurry. An even coating of sintered magnesite stucco (that is to say of granular composition with a particle size of 0.25 to 0.7 mm) was applied. This granular composition was surprisingly effective in causing a gel of the residual slurry upon the wax pattern such that with no further treatment (heating or drying) a further dipping could be carried out within 15 minutes at 20° C. The procedure was repeated so that after one hour the wax pattern had four coats of set ceramic. A further three coats were added using a coarser fraction of sintered magnesite stucco (0.7 to 1.2 mms) to encourage a more rapid increase of shell thickness and thus the strength.

A shell of seven coats was made within two hours with no drying or heating required. The shell so formed had a shell strength similar to a shell made with a silica sol binder which would have required a substantially longer time for drying. The phosphate shells so made were dewaxed immediately and ready to be fired to remove residual wax and the water. The firing called for careful heating to prevent cracking. The shells were heated to 850° C. as is normal practice. The sodium phosphate glass assisting the sintering of the shells. The quantity of sodium phosphate would, in some cases, be detrimental to steel casting.

The remaining slurry remained entirely stable for in excess of 5 weeks with no requirement to make adjustments to the slurry for pH. Evaporation of water was avoided by keeping the slurry in a sealed container. It was necessary to remix in order to ensure homogeneity before subsequent use.

EXPERIMENT 12

Carried out as Experiment 11 except that mono ammonium phosphate (MAP) was used instead of MSP. It was found that after firing at 850° C. the shell was very fragile and extreme care required to avoid collapse of the shell. A further shell was made but fired at 1250° C. This shell showed good strength after firing and was used to make a casting. This high firing temperature is not that normally used in the investment casting industry.

EXPERIMENT 13

Carried out as in Experiment 11 except that 80 g in a 50/50 mixture of MAP and MSP was mixed with 320 g of Molochite 200. This combination gave a satisfactory steel casting. The combination of these two phosphates in this particular ratio is not necessarily an optimum.

EXPERIMENT 14

Carried out as in Experiment 13 except that the combination used was MSP and fine particle, slightly soluble, mono magnesium phosphate. This behaved in a very similar manner to Experiment 13.

EXPERIMENT 15

1000 g of Molochite 200, 125 g of MAP and 125 g of MSP were dry blended and stored in a dry place (sealed container). 1000 ml of water were blended with nylon fibres of 3.3 dtx by 0.5 mm length. It was found that the dry constituents required 450 ml of the liquid to arrive at a viscosity of 30 seconds on a B4 cup. After mixing, as in Experiments 11-14, the preparation of the shell was the same. However it was found that only four coats were required to achieve the same shell thickness as Experiments 11-14. The shells were more robust and it was found that a shell so made could be dewaxed and then immediately fired by plunging the shell into a preheated furnace at 850° C. Surprisingly the shells were found to resist this thermal shock. The shells so formed were readily knocked out after casting the metal. Each of these features aids the reduction of costs of making a casting.

STATEMENTS OF INVENTION

1. An investment casting composition comprising a soluble or partially soluble phosphate, a refractory material and less than 1 wt % of an oxide or hydroxide of magnesium or calcium.
2. An investment casting composition according to statement 1 wherein the composition further comprises insoluble fibres.
3. An investment casting composition according to either preceding statement, which comprises less than 0.4 wt %, 0.37 wt % or 0.3 wt % and preferably 0.2 wt % or less of an oxide or hydroxide of magnesium or calcium.
4. An investment casting composition according to any preceding statement wherein the soluble or partially soluble phosphate comprises mono ammonium phosphate.
5. An investment casting composition according to any preceding statement wherein the soluble or partially soluble phosphate comprises mono sodium phosphate.
6. An investment casting composition according to any preceding statement wherein the soluble or partially soluble phosphate comprises mono potassium phosphate.
7. An investment casting composition according to any preceding statement wherein the soluble or partially soluble phosphate comprises a mixture of two or more of; mono potassium phosphate, mono sodium phosphate and mono ammonium phosphate.
8. An investment casting composition according to any preceding statement wherein the soluble or partially soluble phosphate comprises disodium phosphate, diammonium phosphate, dipotassium phosphate, or mixtures thereof.
9. An investment casting composition according to any preceding statement, wherein the refractory material comprises molochite 200®.
10. An investment casting slurry comprising an investment casting composition according to any preceding statement and water.
11. An investment casting slurry according to statement 10 wherein the viscosity of the slurry is 10-50, and preferably 20-40 on a B4 cup.
12. A method of producing an investment casting shell comprising the steps of;
    providing a slurry comprising water, a refractory material and a soluble or partially soluble phosphate,
    dipping a pattern in the slurry to form a coat of slurry on the pattern,
    applying a stucco composition which comprises magnesium oxide, calcium oxide, magnesium hydroxide or calcium hydroxide to the slurry coated on the pattern, and
    allowing the slurry and the stucco composition to set to form a shell.
13. A method according to statement 12 wherein the slurry is according to either of statements 10 or 11.
14. A method according to either of statements 12 or 13 wherein the $D_{50}$ of the stucco composition is between 0.25 mm and 1 mm.
15. A method according to any of statements 12-14 in which the steps of dipping the pattern, applying the stucco composition and allowing the slurry to set to form a shell are repeated.
16. A method according to any of statements 12-15 further comprising the step of heating the shell to melt the pattern.
17. A method according to any of statements 12-16 further comprising the step of firing the shell at 700-900° C.
18. A method of investment casting comprising the step of delivering molten metal into a fired shell obtainable by the method of statement 17.
19. A method according to statement 18 further comprising the steps of allowing the molten metal to solidify and removing the shell to provide a cast part, and optionally finishing the cast part.
20. An investment casting shell comprising a refractory material and calcium or magnesium phosphate.
21. An investment casting shell according to statement 20 wherein the shell is obtainable by the method of any of statements 12-17.

The invention claimed is:
1. A method of producing an investment casting shell comprising the steps of:
    providing a slurry comprising water, a refractory material and a soluble or partially soluble phosphate,
    dipping a pattern in the slurry to form a coat of slurry on the pattern,
    applying a stucco composition which comprises magnesium oxide, calcium oxide, magnesium hydroxide or calcium hydroxide to the slurry coated on the pattern, and
    allowing the slurry and the stucco composition to set to form a shell.
2. A method according to claim 1, wherein the slurry comprises an investment casting composition comprising monoammonium phosphate, monosodium phosphate, a refractory material, less than 1 wt % of an oxide or hydroxide of magnesium or calcium, and water.
3. A method according to claim 1, wherein the $D_{50}$ of the stucco composition is between 0.25 mm and 1 mm.
4. A method according to claim 1, further comprising the step of heating the shell to melt the pattern.
5. A method according to claim 1, further comprising the step of firing the shell at 700-900° C.
6. A method of producing an investment casting shell according to claim 5 further comprising the step of delivering molten metal into the fired shell.
7. A method according to claim 6, further comprising the steps of allowing the molten metal to solidify and removing the shell to provide a cast part, and optionally finishing the cast part.
8. An investment casting composition comprising monoammonium phosphate, monosodium phosphate, a refractory material and less than 1 wt % of an oxide or hydroxide of magnesium or calcium.
9. An investment casting composition according to claim 8, wherein the composition further comprises insoluble fibres.
10. An investment casting composition according to claim 8, which comprises less than 0.4 wt % of an oxide or hydroxide of magnesium or calcium.
11. An investment casting composition according to claim 10, comprising less than 0.37 wt % of the oxide or hydroxide of magnesium or calcium.

12. An investment casting composition according to claim 10, comprising less than 0.3 wt % of the oxide or hydroxide of magnesium or calcium.

13. An investment casting composition according to claim 10, comprising 0.2 wt % or less of the oxide or hydroxide of magnesium or calcium.

14. An investment casting composition according to claim 8, further comprising mono potassium phosphate.

15. An investment casting composition according to claim 8, further comprising disodium phosphate, diammonium phosphate, dipotassium phosphate, or mixtures thereof.

16. An investment casting slurry comprising an investment casting composition according to claim 8 and water.

17. An investment casting slurry according to claim 16, wherein the viscosity of the slurry is 10-50 on a B4 cup.

18. An investment casting slurry according to claim 16 wherein the viscosity of the slurry is 20-40 on a B4 cup.

* * * * *